United States Patent [19]
Littmann et al.

[11] Patent Number: 5,512,337
[45] Date of Patent: Apr. 30, 1996

[54] PACKAGES WITH CONTROLLED EASY OPEN FEATURES

[75] Inventors: Richard Littmann, Neenah; Ulrich Weingartner, Menasha; Thomas S. Wildenberg, Kimberly; Jerry Jesse, Neenah; Deane E. Galloway, Appleton, all of Wis.

[73] Assignee: American National Can Company, Chicago, Ill.

[21] Appl. No.: 190,302

[22] Filed: Jan. 24, 1994

Related U.S. Application Data

[63] Continuation of Ser. No. 504,175, Apr. 4, 1990, abandoned.

[51] Int. Cl.$^6$ ................................................ B65D 17/28
[52] U.S. Cl. ................. 428/35.4; 220/418; 206/524.2; 264/514; 264/515; 264/209.5; 264/210.3; 264/209.1; 53/462; 53/381.1; 53/384.1; 428/34.3; 428/36.7; 428/36.91; 428/519; 383/113; 383/114; 383/200; 383/202
[58] Field of Search ...................... 264/514, 515, 264/209.5, 210.3, 209.1; 53/462, 381.1, 384.1; 206/524.2; 428/34.3, 35.4, 36.7, 36.9, 36.91, 483, 518, 519; 220/601, 604, 605–613, 418; 383/109, 113, 114, 200, 202, 42, 105, 107, 115, 116; 229/200, 237

[56] References Cited

U.S. PATENT DOCUMENTS

| | | | |
|---|---|---|---|
| 3,608,815 | 9/1971 | Bunch | 229/62 |
| 4,421,823 | 12/1983 | Theisen et al. | 428/349 |
| 4,442,158 | 4/1984 | Distler | 428/195 |
| 4,543,279 | 9/1985 | Kai | 428/35 |
| 4,903,841 | 2/1990 | Ohsima et al. | 206/604 |

*Primary Examiner*—Charles R. Nold
*Attorney, Agent, or Firm*—Mary J. Schnurr

[57] ABSTRACT

An easy open tear control package, preferably a pouch, from a film of polymeric barrier material is disclosed. Methods and films for making of such packages are also disclosed. The easy open tear control feature arises from roughening portions of the outer or inner surface of the films, prior to fabricating into the package. The roughened portion is on one face or on each face of the package and is at least a full width of a seal when the film is made into the package. The roughened portion can extend the entire width of the package and can be of any desired length. A preferred film is a continuous extrusion laminated film comprising, a plurality of superimposed layers which comprise from outer surface to inner surface, a first layer of polyester, a second layer comprising a vinylidene chloride copolymer, preferably a vinylidene chloride methyl acrylate copolymer, a third layer of ink, a fourth layer of primer, a fifth layer of low density polyethylene, a sixth layer of ethylene vinyl acetate, and seventh and eighth layers each of an ionmer resin.

16 Claims, 13 Drawing Sheets

PACKAGES WITH CONTROLLED EASY OPEN FEATURES

CROSS REFERENCE TO RELATED APPLICATIONS

This application is a continuation of U.S. patent application Ser. No. 07/504,175, filed on Apr. 4, 1990, now abandoned.

FIELD OF THE INVENTION

This invention relates to packages, preferably pouches, from a continuous laminate film of polymeric barrier materials; said packages having easy-open tear control features.

BACKGROUND OF THE INVENTION

Films or sheets of polymeric barrier materials are formed into a finished package or "film package" such as a pouch by various techniques. For instance, by forming heat or adhesive seals about the periphery of the shape to be formed into a pouch. For example, if a square pouch is desired, a rectangular film twice the desired length of the pouch is folded, the two parallel sides of the periphery (perpendicular to the fold) heat or adhesive sealed, or, the two parallel sides and the fold are heat or adhesive sealed, the food or other material to be packaged inserted therein, and then the remaining open side of the periphery is heat or adhesive sealed. Another method for making a pouch is by sealing on three sides face-to-face films, filling the thus formed open pouch with food or whatever material is to be packaged therein, and then sealing the fourth side. For background on pouches and their production, reference is made to U.S. Pat. Nos. 4,190,477, 4,311,742, 4,360,550, and 4,424,256, each of which being hereby incorporated herein by reference.

The problem encountered by the end user of the food or material within the pouch is how to open the pouch. The pouches are usually formed from tough or strong polymeric barrier materials so the pouches do not open easily. One method for opening such pouches is to manually rip at the pouch which usually results in its contents spilling all about. Another method is simply cutting open the pouch with a scissor, knife or other sharp object. It is desirable to be able to neatly open a pouch without the need to use a cutting instrument. Furthermore, the problem of how to open a pouch is really two fold: The first problem is how to initiate the opening. The second problem is providing control of the opening across the entire pouch.

To meet this desire of being able to open a pouch without a cutting instrument, some have proposed packages having an opening notch such as V- or I-shaped notch or notches, or a tearing zone, see e.g., U.S. Pat. Nos. 4,934,245, 3,404,988. U.S. Pat. No. 3,693,785 relates to a wrapping material containing regenerated cellulose which has a portion thereof which is more frangible than the remainder thereof. Likewise, U.S. Pat. No. 3,986,640 deals with a flexible package having a cut pattern, which, when bent along the cut pattern, causes the package to open and the flowable contents therein to dispense. U.S. Pat. No. 4,217,327 relates to forming a score line along a predetermined line in the surface of a plastic film to form a tear line. And, U.S. Pat. No. 4,236,652 relates to a package having a cut score area to rupture open the package upon bending.

These previous proposals have not overcome the problem. Notches, cut patterns or tear lines can produce an opening which is easily propagated without any control. Further, notches, cut patterns or tear lines produce areas of weakness in the package, which, when stressed accidentally, e.g., during handling or shipping, can become an unintended opening which is easily propagated. That is, these proposals have not adequately resolved the problem of initiating an opening only when desired and of controlling the opening across the entire package.

Furthermore, these proposals have presented manufacturing problems. For instance, the problem of properly locating the notch, cut pattern or tear line in a position where the consumer desires to open the package. If not properly positioned, the resulting package can be worse than if no such notch, cut pattern or tear line had been provided: The consumer must still resort to a sharp object to open the package, but it is weakened at some point (due to the mispositioned notch, cut pattern, or tear line). In addition, opening features such as those on cigarette packs require a separate opening tape which means that it is more costly to manufacture the package because it requires a separate material (the tape) and a complicated process.

Roughening an area of the package is another type of proposal to open a package without the need for a cutting instruments. U.S. Pat. No. 3,313,642, incorporated herein by reference, relates to a process of modifying the surface properties of polyolefin film.

U.S. Pat. No. 4,778,058 provides a pouch from a film of two plastic layers. A discreet area of the first layer, corresponding to a folded portion of the resultant pouch, is surface roughened prior to lamination to the second layer. The irregularities from roughening are filled with the plastic material of the second plastic layer. The film of the two layered film is heat-sealed into a pouch. The surface roughening is at a position on the first layer of the film other than the portion thereof to be heat sealed. While U.S. Pat. No. 4,778,058 may provide for tear initiation, it still fails to provide for control of the tear as is desired by the end user.

U.S. Pat. No. 4,543,279 relates to a film product, such as a sealed bag, wound film or adhesive tape, having a plurality of random scratches or cuts formed along the edges and oriented toward the other side of the film. In a bag of U.S. Pat. No. 4,543,279, the scratches are formed on the longitudinal edge portion of the bag, outside of the seals thereof, or on the longitudinal edge portion outside of the seal and on a central line inside the seal. There is no teaching or suggestion to roughen areas of films where the seals of a resultant pouch are to be located. Further, while placing scratches on a central line inside the seal may provide for tear initiation, the placement of the scratches outside of the seals may not adequately provide for tear initiation as the user must still rip through the seals. And, no provision is made for tear control.

U.S. Pat. No. 3,608,815 relates to an opening aid for packages made from at least one oriented material. The opening aid consists of minutely expanding the oriented material at a plurality of points within an area pattern which will be a fold (and not a seal) of the package. U.S. Pat. No. 3,608,815 simply provides tear initiation like the previously discussed notch or cut techniques. However, U.S. Pat. No. 3,608,815 chalks up tear control to the nature of the materials of the package, stating that oriented materials "tear in an essentially straight line" while cellophane will tear without directional control. Thus, U.S. Pat. No. 3,608,815 does not adequately provide tear control.

Japanese Utility Model Publication No. 54-22484, published Aug. 6, 1979 (Application No. 50,68727 dated May 23, 1975; Early Disclosure No. 51-150915, dated Dec. 2, 1976), relates to a bag having seals with tear-initiating lines. The tear initiating lines consist of ordered, successively smaller pinholes or notches extending from the outer edge of the seal and terminating at the center of the seal so that the inner half of the seal is the same as an ordinary seal. It is stated in this publication that the holes or notches are not to extend all the way into the enclosed part of the bag, i.e., across the entire width of the seal, because to do so will impair the strength and the airtightness of the seal. Further, this publication poses manufacturing problems which it leaves unaddressed. To effect the tear-initiating line, the films of the bag must be selectively cut or notched: The cuts or notches are organized along lines and are of varying size and extend only through one-half of the seal. Thus, this publication calls for a very complicated manufacturing process.

Japanese Patent Publication No. 51-48775, published Dec. 22, 1976 (Application No. 49-49804 dated May 7, 1974; Early Disclosure No. 51-16346, dated Feb. 9, 1976), deals with placing minute scars, embossment or scratches along the center line of a laminate plastic film which is then slit lengthwise along the center line to make two adhesive tapes. The problems of tear initiation and tear control in the opening of packages are not addressed in this publication.

Thus, heretofore, it has not been taught or suggested to roughen portions of an outer or inner surface of a film along an edge or portion thereof which is at least the full width of at least one seal when the film is made into a pouch so that the pouch has an easy tear-open feature edge (tear initiation) inward at the localized area of the seal (tear control).

Heretofore, a continuous laminate film which is extruded and surface roughened on the outer or inner surface at an isolated area which is to be at least the full width of at least one of the seals when the film is made into a pouch so that the pouch has an easy tear-open feature edge inward at the localized area of the seal has not been taught or suggested.

Further, heretofore, a continuous laminate film of (outer surface) polyester/vinylidene chloride copolymer/ink/ primer/LDPE/EVA/Surlyn (Du Pont)/Surlyn (inside surface) which is extruded and roughened on the outer or inner surface of the polyester layer at an isolated area which is to be at least the full width of at least one of the seals when the film is made into a pouch so that the pouch has an easy tear-open feature edge inward at the localized area of the seal, has not been taught or suggested.

It is thus an object of this invention to provide a pouch which is not complex to manufacture (and thus less costly than prior pouches) and which has tear initiation and tear control features by being formed from a continuous laminate film which is extrusion laminated and roughened on the outer or inner surface at an isolated area which is to be at least a full width of at least one of the seals of the resultant pouch.

SUMMARY OF THE INVENTION

It has been surprisingly found that tear initiation and tear control are achieved in a pouch formed from film of a polymeric barrier material roughened on the outer or inner surface at an isolated area which is at least the full width of at least one seal of the resultant pouch. The film is preferably a continuous laminate film which is extrusion laminated.

Thus, the present invention provides an easy open, tear control pouch comprising polymeric barrier material film structure sealed together such that the pouch has a front face and a rear face wherein an outer or an inner surface of the said film structure at an isolated area which is to be at least a full width of at least one seal, front face and/or rear face, when said film structure is sealed together to form the said pouch, is roughened. The film structure preferably comprises an extrusion laminated film comprising a plurality of superimposed layers comprising, from outer surface to inner surface, a first layer comprising polyester, a second layer comprising polyvinylidene chloride copolymer, preferably a polyvinylidene chloride methyl acrylate copolymer ("MA-PVdC"), a third layer comprising ink, a fourth layer comprising primer, a fifth layer comprising low density polyethylene (LDPE), a sixth layer comprising ethylene vinyl acetate (EVA), a seventh layer comprising Surlyn (an ionomer resin from Du Pont), and an eighth layer comprising Surlyn.

The present invention also provides processes for making the easy tear open pouch. The film structure can be from a sheet or sheets of a film or from a tube.

DETAILED DESCRIPTION

It has now been surprisingly found that an easy open tear control pouch is easily manufactured by (i) forming, preferably extruding, face-to-face films comprising barrier polymeric material, (ii) roughening an isolated or specific portion on the outer or inner surface of one or of each film, said portion corresponding to at least a full width of at least one seal when said films are positioned face-to-face and sealed into the form of the pouch, (iii) sealing three sides of the face-to-face films with the outer surfaces facing out and if both faces roughened (inner or outer), said roughened portions preferably in substantial alignment, to form an open pouch, (iv) filling the thus formed open pouch, and (v) sealing the remaining side to form a closed pouch.

Steps (iii) to (v) can also be performed by placing the fill of the pouch on the inside surface of one of the face-to-face films, positioning the other face-to-face film thereover with the inside surface thereof adjacent to said fill and with said roughened surfaces preferably in substantial alignment (if both faces are roughened), and sealing the periphery of the films with the fill therebetween. Steps (i) and (ii) can be performed by forming, preferably extruding, a film having each face of the pouch (the front and rear) juxtaposed, and roughening isolated or restricted specific area(s) about the center on either or both faces and on the outer or inner surface of the film corresponding to at least a full width of a seal of the resultant pouch. In the instance where a single film having each face of the pouch juxtaposed is extruded, the film can be slit along the center line, through the restricted areas to form two longitudinal sheets for the front and rear faces of the pouch. Alternatively, the film can be folded and sealed along the center line.

Furthermore, a pouch of this invention can be made by forming, preferably extruding, a tube of polymeric barrier material; roughening a circumferential area or portion thereof of the outer or the inner surface of said tube at at least one end thereof, said area corresponding to the width of the seal to be formed; sealing one end of said tube to make an open pouch; filling said open pouch; and, sealing the open end.

The present invention also provides products from the aforementioned process. In particular, the present invention provides an easy open, tear control pouch having aligning front and rear faces and comprising polymeric barrier film structure sealed together to form the pouch wherein for at least one face an outer or an inner surface of the said film structure at an isolated area which is to be at least a full width of at least one seal, is roughened. The roughened area can extend beyond the width of the seal, even across the entire width of the pouch. Film sheets for pouches with roughening beyond the width of the seal can be made accordingly.

Note that the contents of the pouch of this invention is not to be a limitation of the invention.

It is presently preferred that the polymeric barrier material be a continuous extrusion laminated film, comprising a plurality superimposed layers; said layers comprising from outer layer to inner layer, a first layer comprising polyester, a second layer comprising polyvinylidene chloride copolymer preferably MA-PVdC, a third layer comprising ink, a fourth layer comprising primer, a fifth layer comprising LDPE, a sixth layer comprising EVA, a seventh layer comprising an ionomer resin, preferably Surlyn, and an eighth layer comprising an ionomer resin, preferably Surlyn. The EVA can be a high VA content EVA, i.e., about 28–35% by weight VA EVA, e.g., Exxon LD-761 (app. 28% VA EVA). The primer can be any conventional primer. And, the ink can be any conventional ink. If the pouch is to be used for food, drugs, cosmetics or the like, it is preferred that the primer and the ink meet governmental, e.g., FDA, regulations.

It is also preferred that the film be provided with the surface roughening in-line on a roto press. Further, a preferred film is made as one film with the front and rear portions of the pouch juxtaposed; and, that the roughening be about a center line thereof. It is preferred that the film is then slit along the center line through the restricted areas to form two longitudinal sheets for the front and rear of the pouch. The front and rear portions are then aligned, sealed on three sides, filled and sealed on the fourth side. The resulting pouch has at least one localized area(s) of surface toughening portions along at least one seal. Pouches of this invention can be heat or adhesive sealed.

However, rather than using ink, any appropriate printing process can be employed, e.g., a rewinder which imprints appropriate characters into the film comprising polymeric barrier material. The roughening can be embossed holes, notches, scratches or the like and can be applied by an embossing roll, wire brush, a gritty surface, e.g., a tungsten carbide gritty surface or sand paper, preferably a gritty surface or sand paper which does not lose its gritty particles during use, or the like. The roughening is provided on the outer or the inner surface of the film of polymeric barrier material; and, the roughening can be random. It need not be along a set line or of successively smaller holes or notches. Further it is not required that the irregularities from roughening be filled with material from another layer of the film. It has been found that when the roughening is provided on the outer or inner surface for one or both faces of the pouch for at least the full width of at least one seal edge, and even across the width of the pouch, the seal is not weakened and its airtightness is not impaired, and the resulting pouch has an easy-to-tear opening feature edge at the localized area(s) of the sealed margin of the pouch corresponding to the roughened surfaces (i.e., tear initiation and tear control).

Vinylidene chloride copolymers as mentioned herein include vinylidene chloride vinyl chloride copolymers (VC, HB Sarans, Dow Chemical Co.), and vinylidene chloride methyl acrylate copolymers (MA Saran, Dow 119, Dow Chemical Co., MA-PVdC copolymers containing essentially no EVA, U.S. application Ser. No. 07/458,484, filed Dec. 28, 1989 and issued on Apr. 28, 1992 as U.S. Pat. No. 5,108,844 and incorporated herein by reference). As to polyvinylidene chloride films and methods of making and using them, attention is further directed to commonly owned U.S. Patent applications Ser. No. 07/458,485, filed on Dec. 28, 1989 and issued on Feb. 18, 1992 as U.S. Pat. No. 5,089,308 and Ser. Nos. 07/458,489 and 07/458,490, both filed on Dec. 28, 1989, now abandoned, and each incorporated herein by reference. In MA-PVdC copolymers, the methyl acrylate is preferably present in an amount of about 3 to 8% by weight, more preferably from 6 to 8% by weight, based upon total weight. However, the methyl acrylate content can be up to 12% and even up to 15% in some instances.

As to extrusion or co-extrusion methods and apparatus for making multiple layer sheet materials, reference is made to commonly owned U.S. patent application Ser. Nos. 07/458,486, 07/458,487, and 07/458,488, all filed on Dec. 28, 1989 and issued on: Apr. 21, 1992 as U.S. Pat. No. 5,106,562; Aug. 17, 1993 and U.S. Pat. No. 5,236,642; and Sep. 1, 1992 as U.S. Pat. No. 5,143,677, respectively, and each incorporated herein by reference. And, as to blended film structures, reference is made to commonly owned U.S. patent application Ser. No. 07/458,489, filed Dec. 28, 1989, now abandoned, and incorporated herein by reference. For further background on films and apparatus for producing them, reference is made to U.S. Pat. Nos. 3,477,099, 4,755,402, 3,558,330, 4,714,638, 4,842,791, 4,379,117, and 4,804,510 each of which being incorporated herein by reference.

While the preceding text and elsewhere herein speaks of "extruding", it should be understood that this invention is applicable to any process for forming films (which can then be formed into a pouch), including laminations, extrusions, coextrusion, blown extrusion, tubular water quench extrusion, extrusion coating, and the like, and combinations thereof. Likewise, the present invention is applicable to any process and apparatus for forming a pouch (so long as at least a width of one seal thereof is from a roughened outer or inner surface), including, a horizontal pouch forming machine and a vertical form, fill and seal machine.

Furthermore, in addition to the above-disclosed preferred extrusion laminated film, other films (of either single or multi-layers) comprising polymeric barrier materials can be formed into an easy open tear control pouch in accordance with this invention. Suitable materials for such other films can be almost any materials conventionally used in the art, e.g., metal foil, polyethylene (PE), medium density polyethylene (MDPE), high density polyethylene (HDPE), low density polyethylene (LDPE), linear low density polyethylene (LLDPE), very low density polyethylene (VLDPE), polypropylene (PP), ultra linear low density polyethylene (ULDPE), propylene ethylene copolymer (PPE), nylon, high impact polystyrene (HIPS), ethylene butene copolymers (EB), polyethylene terephthalate (PET), copolymers of PET or CoPET, or EVA (in which case preferably a high VA content EVA, i.e., about 28–35% by weight VA EVA), or the like, or mixtures thereof. In multilayer films, a tie or an adhesive may also be present between the layers. Suitable materials for such tie layers or adhesives are known to the ordinary skilled artisan and may include, by way of example, anhydride modified polyolefins, ethylene acrylic acid copolymers, ethylene methyl acrylate copolymers, blends or copolymers of PP and EVA, or other synthetic resinous materials. The selected adhesive should be stable under the conditions by which the films of the invention are prepared or used. For additional information on adhesives, reference is made to commonly owned U.S. patent application Ser. No. 07/458,489, filed Dec. 28, 1989, now abandoned. Commercially available products for layers in products of the invention include nylon 6; 11; 12; 6, 12; and 6, 66; ULTRAMIDKR 4600 (BASF), NOVAMID 2030 (Mitsubishi Chem. Co.) DURATHANE (Farbenfabriken Bayer A. G.), "1030" (Unitika, Japan), ZYTEL SUPERTUFF 811 (Du Pont), "4018" (Huels, Germany), and ELY 1256 (Elmser, Switzerland), Mylar, Dalar, Exxon 5610A-2 (blend of PP containing EVA), Admer (Mitsui, No. AT469C), Bynel (Du Pont E361 or 3036), Plexar 3342, and Surlyn. Admer, Bynel and Plexar are believed to be Maleic anhydride modified polyolefins.

Films in this invention, may be oriented, if desired, e.g., for a particular end use, by conventional processes, such as blown tubular orientation, stretch orientation, or molecular orientation. They may also be cross-linked by conventional processes such as by irradiation, heat, or the addition of cross-linking agents.

Films in this invention are the same thickness a conventional films, i.e. about 2.0 mils (0.051 mm) with as normal range of about 0.5 to about 5.0 mils, preferably about 1.5 to about 3.0 mils (0.038–0.076 mm). Films thinner than about 1.5 mils (0.038 mm) may be too weak to perform their required functions (although individual layers of multilayer structures may be thinner than about 1.5 mils, e.g. about 0.25 to about 1 mil. Films thicker than about 3.0 mils (0.076 mm) may be economically less competitive, although films up to about 20 mils (0.51 mm) are functional.

Figure 4:
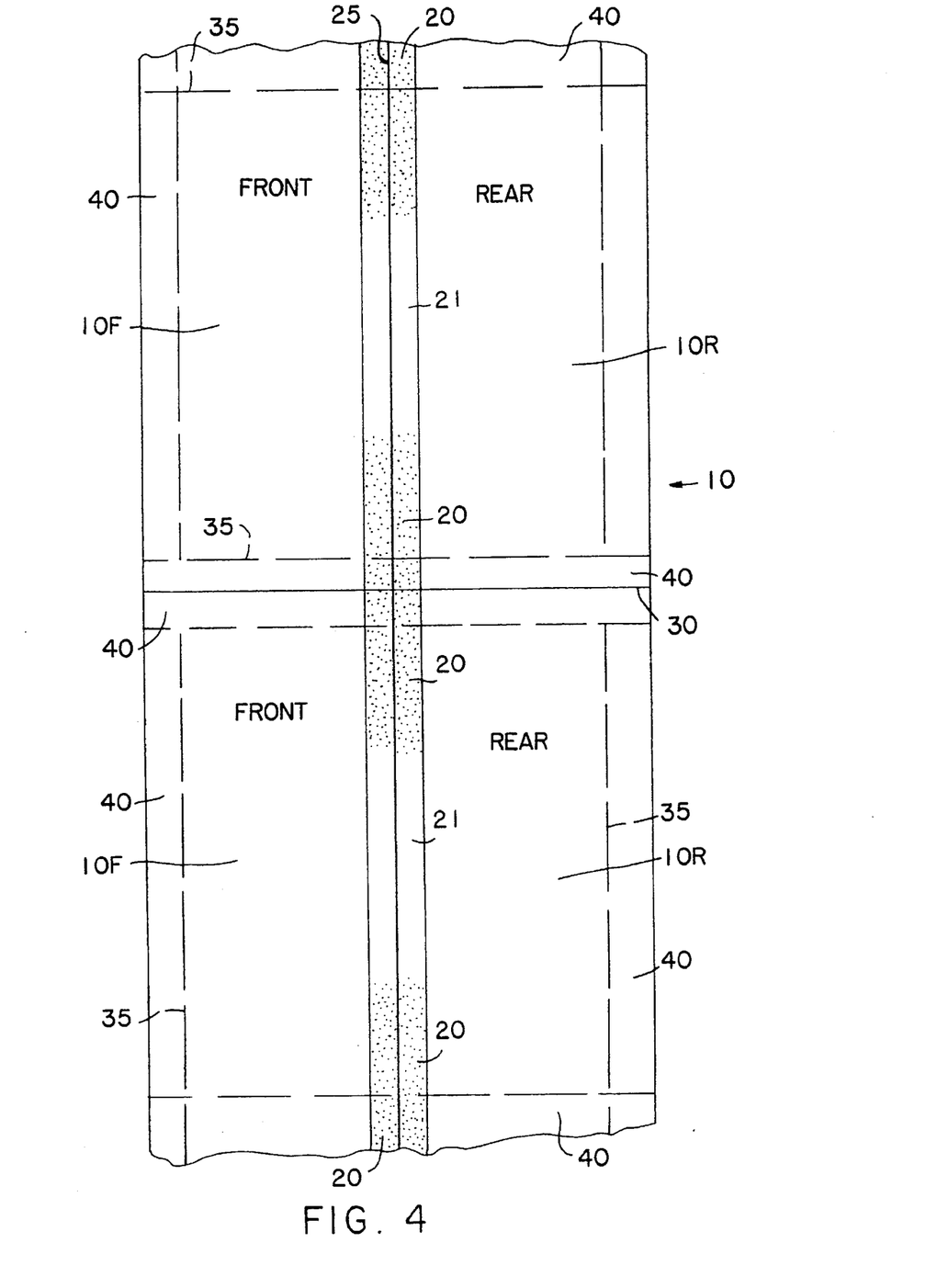
Figure 5:
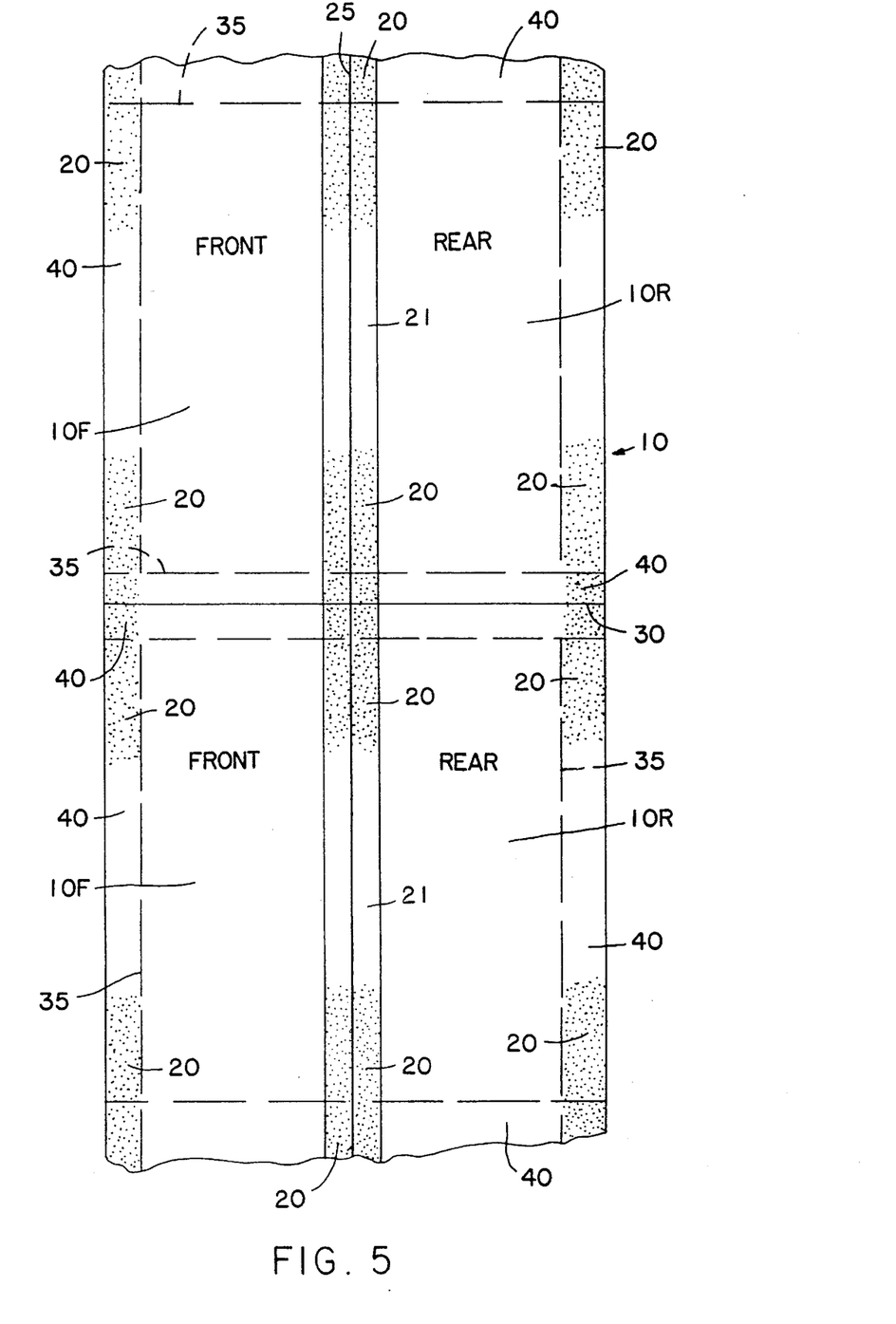
Figure 6:
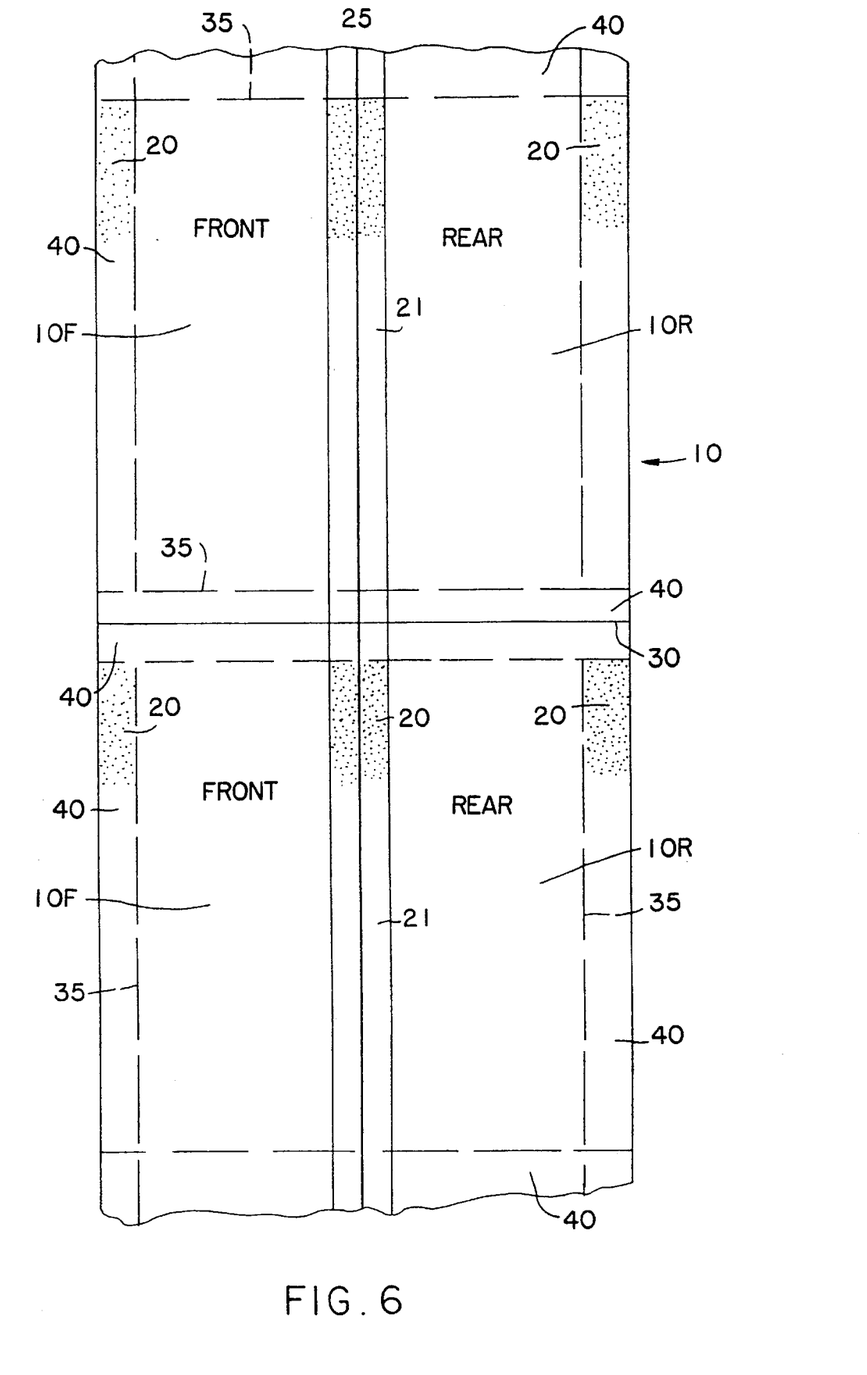

Referring now to the Figures, FIGS. 1, 4, 5, 6, 11, 12 and 14 show film sheet 10 for forming into a pouch of the invention. Front and rear portions 10F and 10R, respectively, denote the portions of film sheet 10 which will become the front and rear faces of the pouch. Areas 20 are the specific portions of the outer or inner surface of film sheet 10 which have been roughened. Note that the roughening can be random. The roughening can also be in any desired orientation relative to machine direction (MD) or cross machine direction (CMD) of the finished package. The roughening can be only on one face of the pouch, e.g., either the front or the rear face, and need not be on both as shown. Further, by comparing FIG. 1 with FIGS. 4, 5 and 6 it is noted that the roughening need not extend the full length of what will be the seal of the resultant pouch, but can be only a portion of the length of the seal, e.g., areas where corners will be in the resultant pouch. Area 21 in FIGS. 4, 5 and 6 is an area about center line 25 which is not roughened.

Center line 25 is where film sheet 10 can be slit or folded to form two longitudinal sheets for the front and rear of the pouch. Horizontal line 30 denotes where film sheet 10 or two longitudinal sheets therefrom can be separated so as to form a plurality of pouches. Dotted lines 35 denote borders as seals will be formed in areas 40. Film sheet 10 may not actually bear dotted lines; they are provided herein simply to show that a portion of film sheet 10 is to become a seal. Areas 40 or portions thereof, e.g., those which are parallel to area 20 and/or those which are perpendicular to area 20, can also be roughened (See, e.g., FIGS. 5, 6, 11 12). Front and rear portions 10F and 10R can bear writing relating to the product to be packaged within the pouch; or, instructing the end user as to which seal or seals has the easy tear, controlled opening feature.

Figure 1:
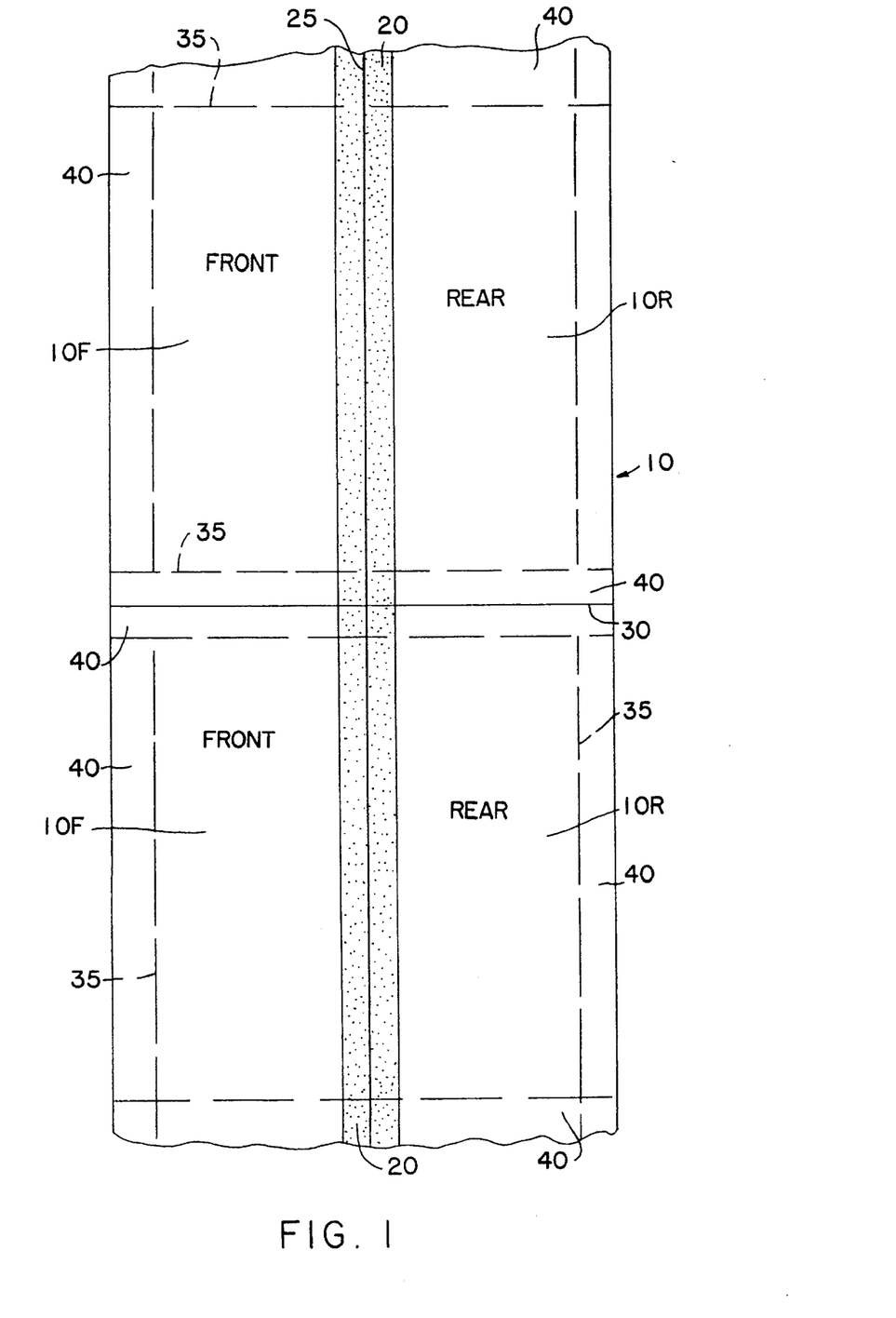
FIGS. 1, 4, 5, 6, 11, 12 and 14 show a film sheet for forming into a pouch of the invention.
Figure 2:
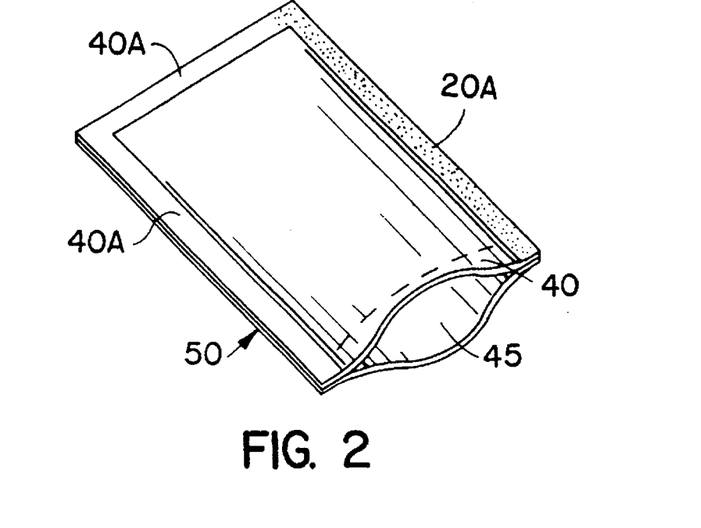
FIGS. 2, 7, 8 and 9 show an open pouch of the present invention.
Figure 2A:
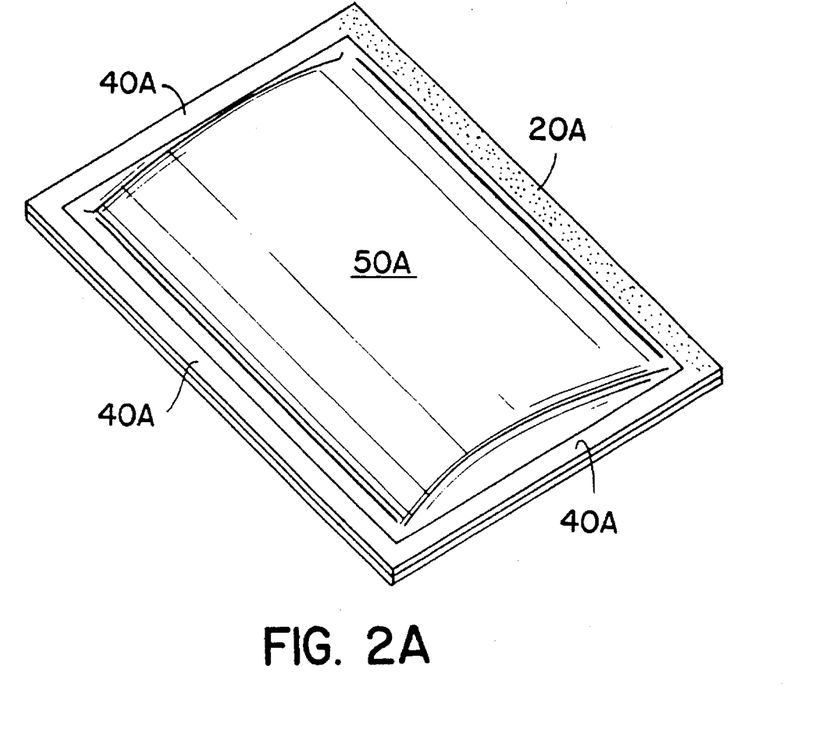
FIGS. 2A, 7A, 8A, 9A and 13 show a sealed pouch of the present invention.
Figure 7:
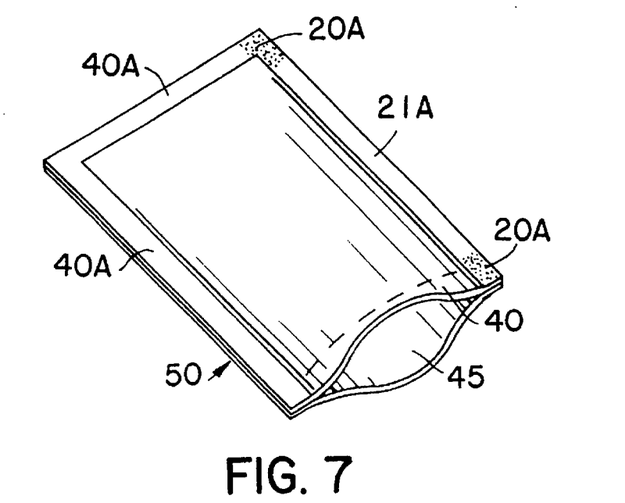
Figure 7A:
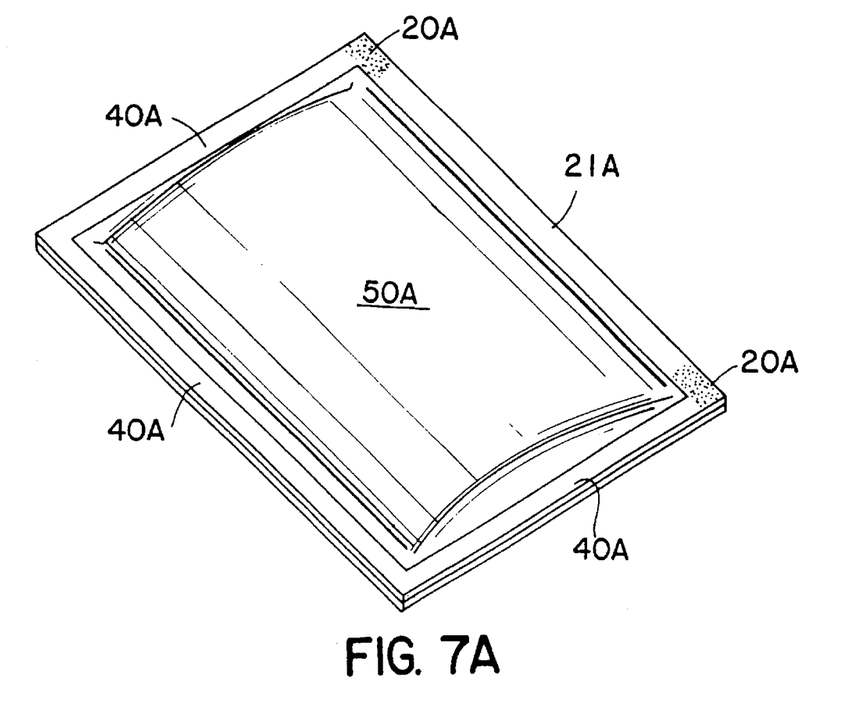
Figure 8:
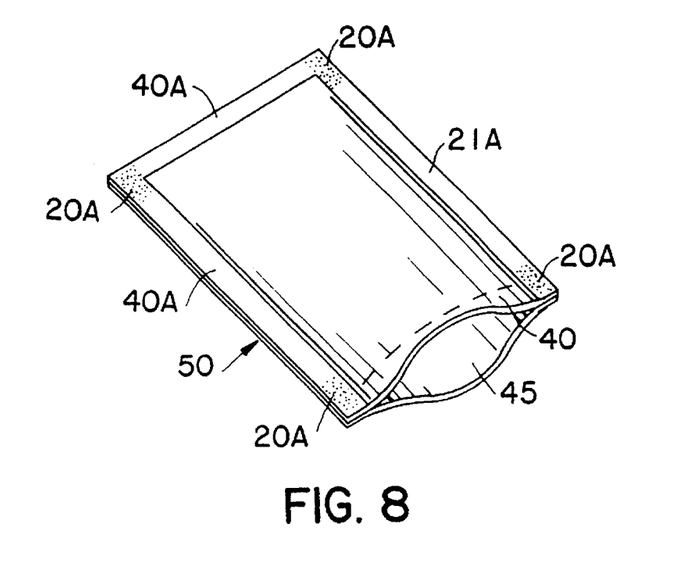
Figure 8A:
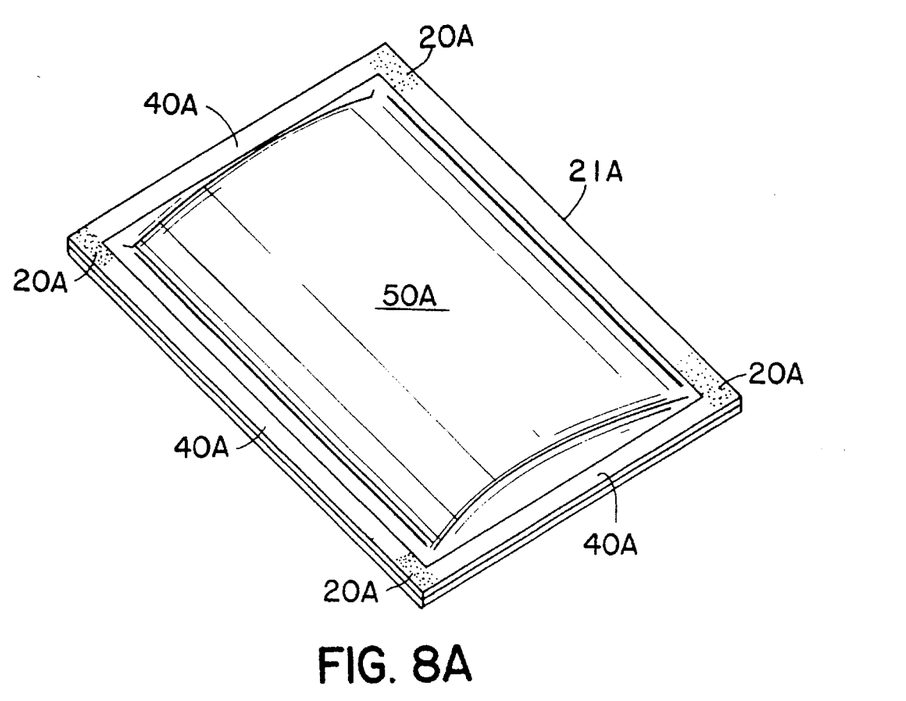
Figure 9:
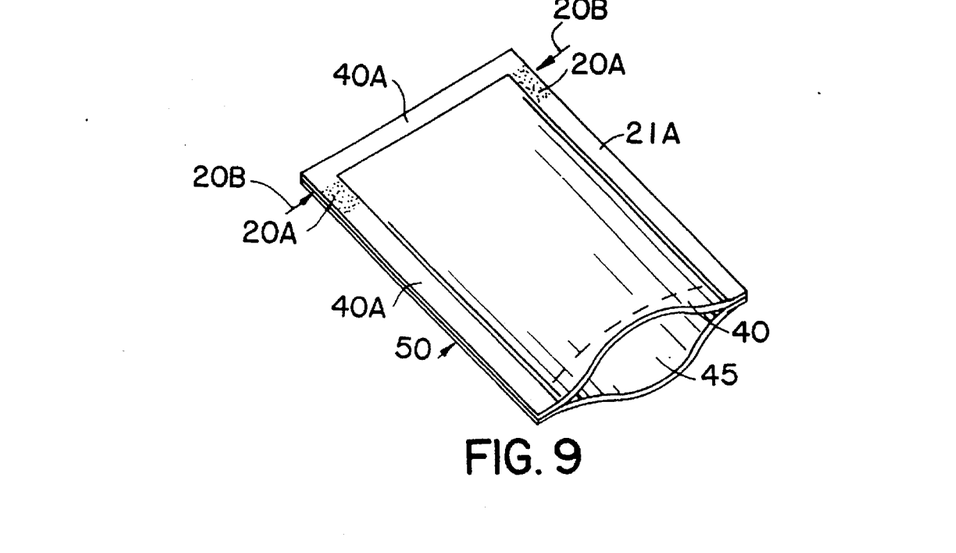
Figure 9A:
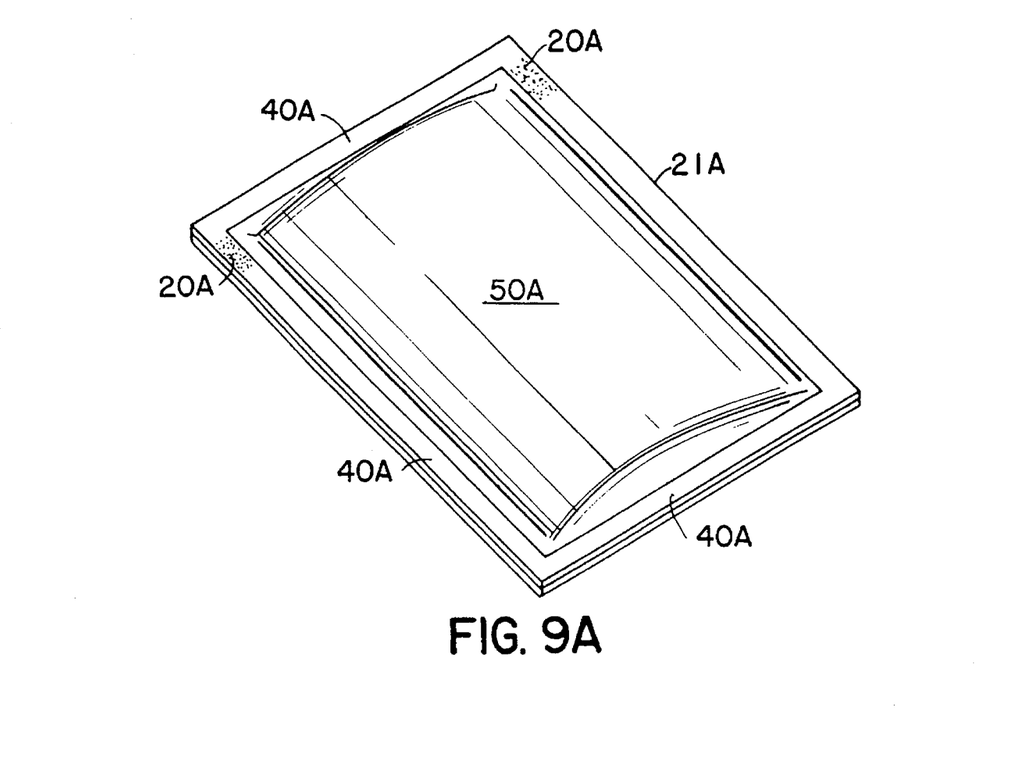

If one cuts or folds along lines 25 and 30, appropriately aligns front and rear portions 10F and 10R and seals at areas 20, 21 (FIGS. 4, 5, 6) and areas 40, the result is open pouch 50 (FIGS. 2, 7, 8, 9). Seal 20A is shown dotted, but can be indistinguishable from seals 21A and 40A. After the product to be packaged within pouch 50 is loaded therein, opening 45 is sealed and the result is sealed filled pouch 50A (FIGS. 2A, 7A, 8A, 9A). Again, seal 20A is shown dotted, but can be indistinguishable from seals 21A, and 40A. An end user can tear open pouch 50A at seal 20A perpendicularly to seal 20A near seals 40A which are perpendicular to seal 20A. In particular, as shown in FIG. 9A, an end user can tear in the directions indicated by arrows 20B. The resultant tear will be easy and controlled due to the roughening. Comparing FIGS. 1, 4, 5 and 6 with FIGS. 2, 7, 8 and 9 and with FIGS. 2A, 7A, 8A and 9A, it should be apparent that pouches 50 and 50A in FIGS. 2 and 2A are from sheet 10 in FIG. 1; pouches 50 and 50A in FIGS. 7 and 7A are from sheet 10 in FIG. 4; pouches 50 and 50A in FIGS. 8 and 8A are from sheet 10 in FIG. 5; and, pouches 50 and 50A in FIGS. 9 and 9A are from sheet 10 in FIG. 6. Note the registered treated (roughened) areas in each of the aforementioned Figures. Likewise, with reference to FIGS. 2, 4, 5, 6, 11 and 12 it should be apparent that the roughened area 20 need not be about center line 25 but can be omitted therefrom and can be on the area 40 parallel to center line 25 and/or on the areas 40 perpendicular to center line 25. Currently sheet 10 as depicted in FIG. 6 and the resultant pouches 50 and 50A as depicted in FIGS. 9 and 9A are preferred; and, in this instance the roughened area 20 is about one inch long and about ⅜ inch wide on each side of center line 25 and on each side of sheet 10 (in area 40).

Figure 3:
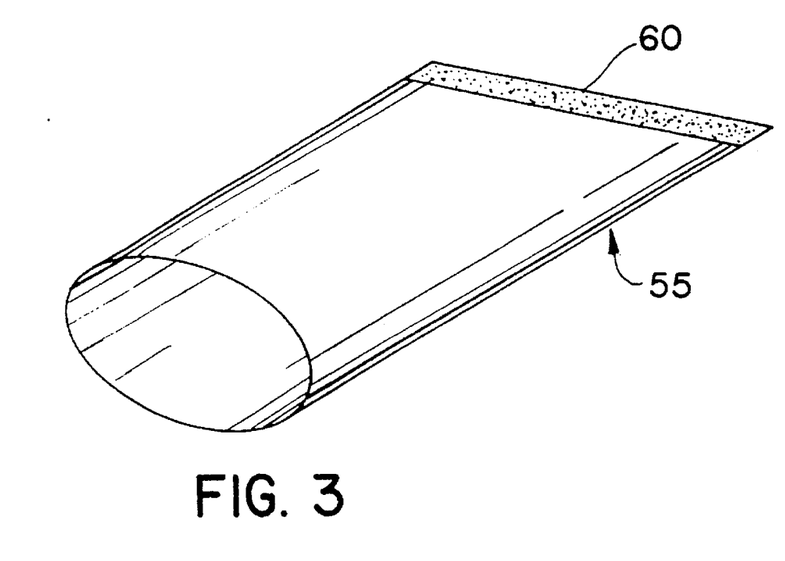
FIGS. 3 and 10 show an open pouch of the present invention.
Figure 10:
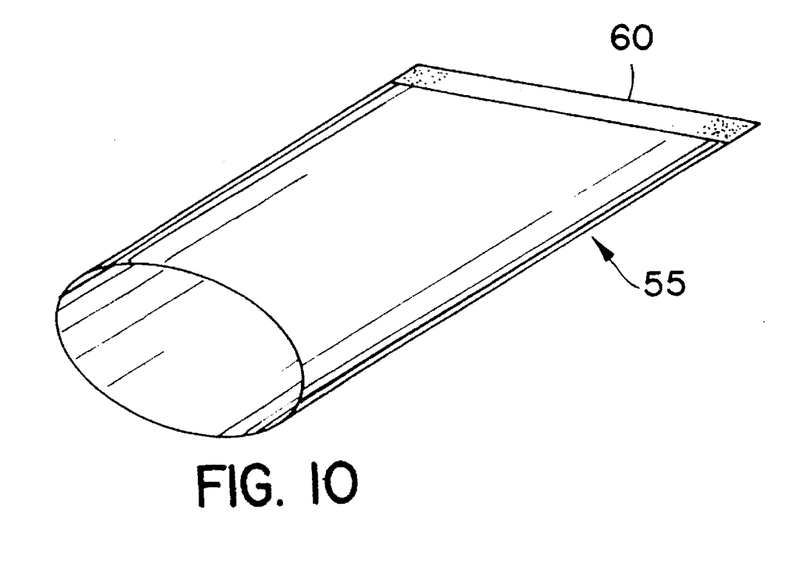
Figure 11:
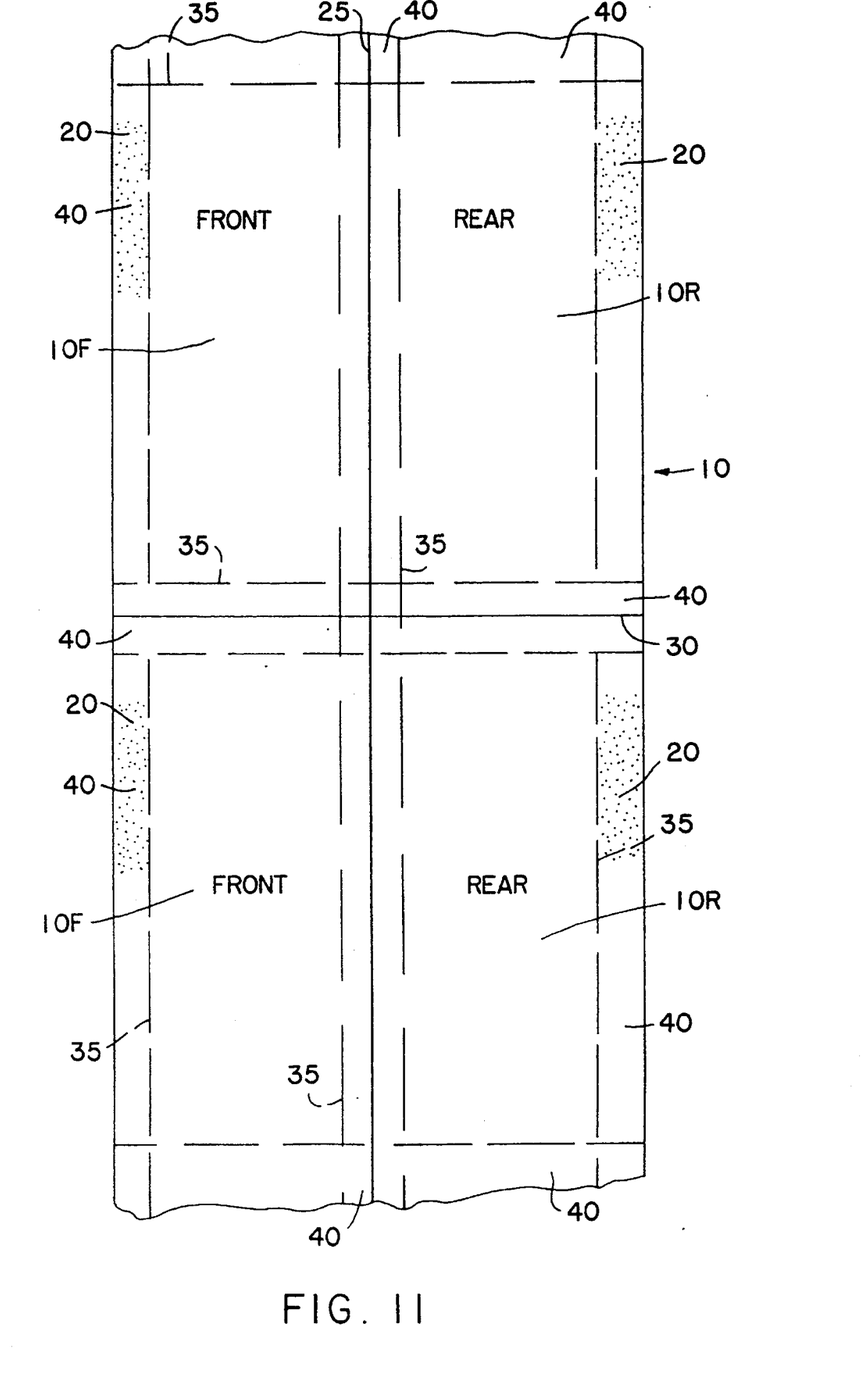
Figure 12:
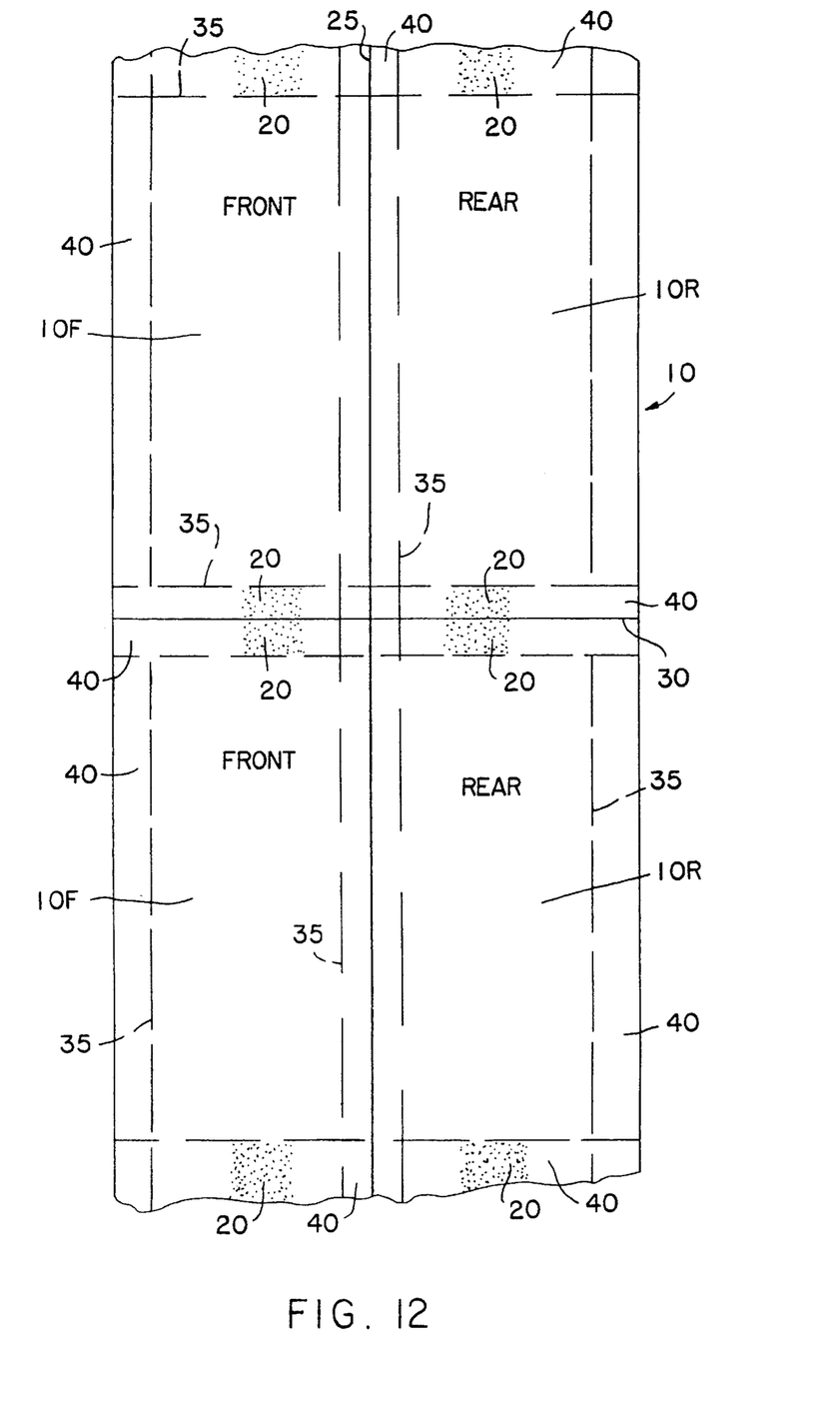

Open pouch 55 (FIGS. 3, 10) can be fabricated from a tube by forming a seal at area 60 (see commonly owned application Ser. No. 458,488, filed Dec. 28, 1989 and issued on Sep. 1, 1992 as U.S. Pat. No. 5,143,677. The inner surface of the tube forms the inner surface of pouch 55 and the outer surface of the tube forms the outer surface of pouch 55. Area 60 of the tube (prior to sealing thereat) is roughened in accordance with this invention, either circumferentially, as shown in FIG. 3, or for a portion circumferentially as shown in FIG. 10, but for a full width of a seal so as to provide the easy tear open feature. The roughening can be on the inner or the outer surface of the tube. Again, it is noted that the roughened portion of area 60 is shown dotted, but can be indistinguishable from a seal from a non-roughened outer or inner surface.

Figure 13:
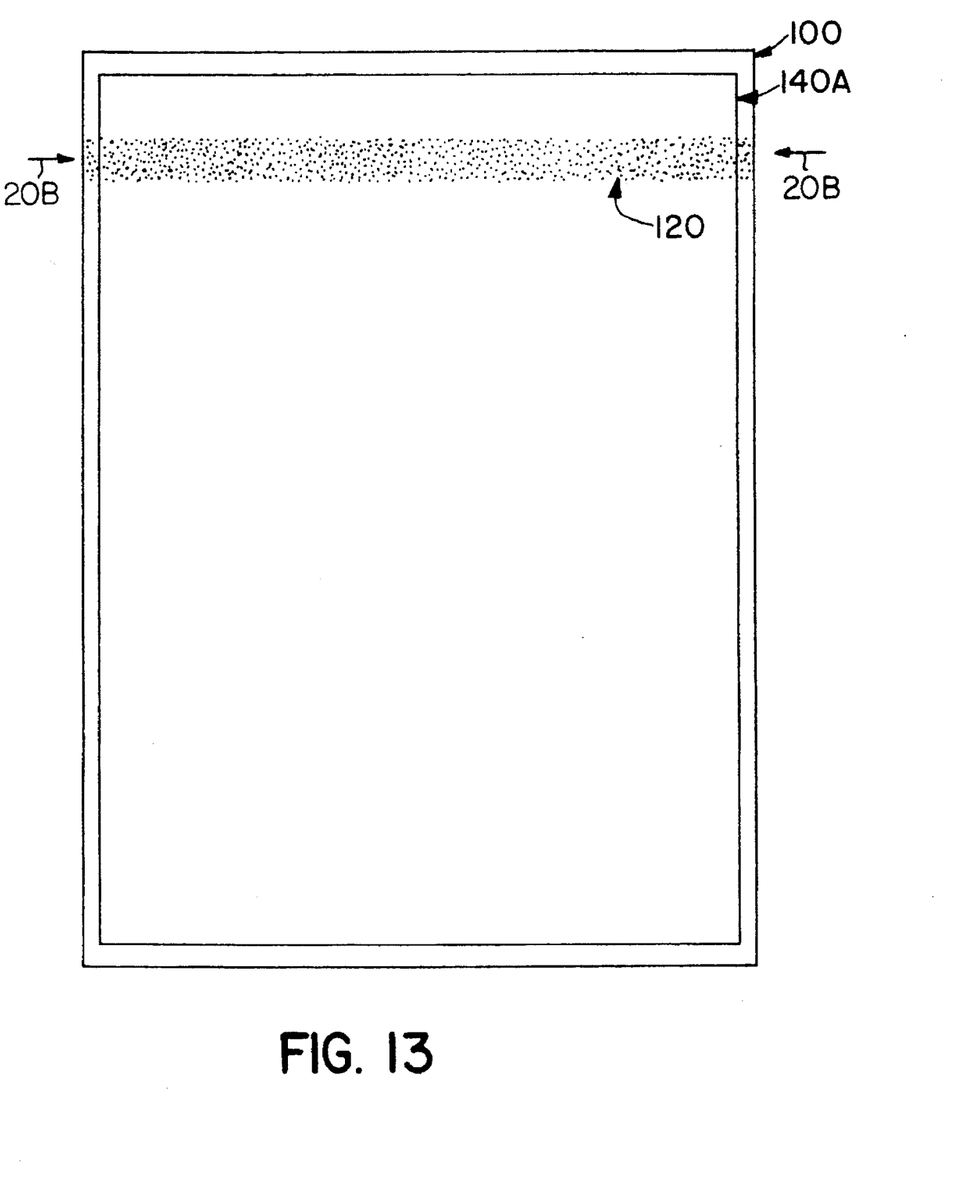

FIG. 13 shows sealed pouch 100 of the present invention. Seals 140A are about the perimeter. Roughened area 120 is on either the inner or the outer surface of either or both the front and rear faces of pouch 100. Note that in this embodiment, roughened area 120 extends not only the full width of at least on seal, but for the full width of pouch 100. The roughened area is shown as dotted but may be indistinguishable from the rest of the pouch. Note further that the roughened area is positioned at a distance from the top seal, and can be for example one-third of the way down from the top seal of the pouch, or further, if desired. For instance, one may position roughened area 120 where the top of the product within the pouch will sit, e.g., in the middle of the pouch. The length of the registered area (roughened area 120) can be of any desired length and it is preferred that it is sufficient for initiating a good tear. It is preferred that roughened area 120 be parallel to the top seal of the pouch as this provides a good straight tear. Arrows 20B show the direction to tear open pouch 100 at roughened area 120.

Figure 14:
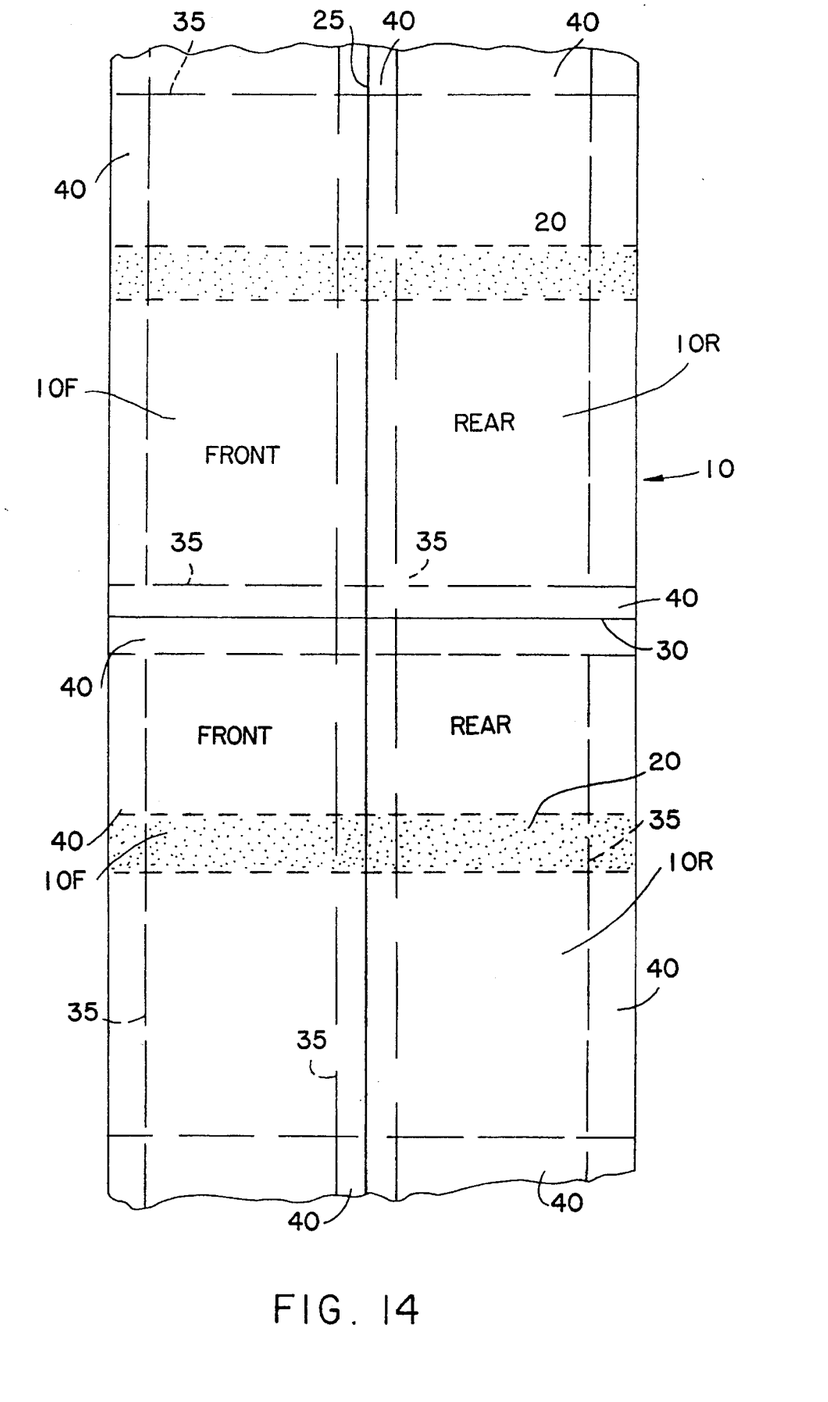

FIG. 14 shows film sheet 10 for making a pouch of FIG. 13. Note that roughened areas 20 extend across the sheet, i.e., roughened areas 20 are on both, the front and the rear face of the resultant pouch; but, roughened areas 20 only need be provided on a front face or on a rear face of the resultant pouch and can be provided on either the inner or the outer surface of film sheet 10.

Pouches made in accordance with this invention have many uses. They can be filled with food, e.g., shredded cheese, medical supplies, blood etc. They can be used as retort pouches. They can also be employed in modified atmosphere packaging wherein the product to be contained within the pouch and the pouch are prepared under a sterile and/or inert atmosphere, and the product is packaged within the pouch under the same conditions.

Having this described in detail preferred embodiments of the novel packages with controlled easy open features of the present invention, it is to be understood that the invention defined by the appended claims is not to be limited by particular details set forth in the above description as many apparent variations thereof are possible without departing from the spirit or scope of the present invention.

What is claimed is:

1. A hollow tube for making an easy open airtight tear control pouch comprising a polymeric continuous extrusion laminated, oriented barrier film, said tube having a first end and a second end, an outer surface and an inner surface and roughened circumferential area, or portion of a circumferential area, on at least one of said surfaces on at least one end of the tube, said roughening made either continuously or randomly in either the machine direction or cross machine direction, said area corresponding to at least a full width of a seal when said end is sealed to form a pouch, said polymeric barrier film comprising in order: an outer layer of polyester, a layer comprising polyvinylidene chloride copolymer, a layer of low density polyethylene, a layer of ethylene vinyl acetate having a vinyl acetate content of from about 28% to 35% by weight, a first layer of an ionomer resin and a second layer of an ionomer resin, wherein the second layer of an ionomer resin forms the inner surface in contact with the contents of the pouch.

2. The hollow tube according to claim 1 wherein the polymeric barrier film comprises polyvinylidene chloride methylacrylate copolymer having a methyl acrylate content of up to about 12% by weight and the film is irradiated.

3. The hollow tube according to claim 2 wherein the polyvinylidene chloride methyl acrylate copolymer contains from 3% to 8% by weight methyl acrylate and the film is from about 1.5 to about 3.0 mils thick.

4. The hollow tube according to claim 2 wherein the toughened areas are located at the corners of the pouch and the pouch is suitable for retort applications.

5. An easy open airtight tear control pouch comprising a sheet of a first polymeric continuous extrusion laminated, oriented barrier film structure sealed to a sheet of a second polymeric continuous extrusion laminated, oriented barrier film structure to form a pouch having a first outer surface and a second outer surface, said second outer surface being on the side opposite said first outer surface, said pouch having first and second inner surfaces on said first and second sheet structures respectively, in a face to face relationship, wherein at least one of said surfaces has a roughened area across at least the full width of at least one seal of said pouch, said roughening made either continuously or randomly in either the machine direction or cross machine direction, said roughened area substantially providing, in opening the pouch, the tear initiation and tear control, said first and second polymeric barrier film structures comprising in order: an outer layer of polyester, a layer comprising polyvinylidene chloride copolymer, a layer of low density polyethylene, a layer of ethylene vinyl acetate having a vinyl acetate content of from about 28% to 35% by weight, a first layer of an ionomer resin, and a second layer of an ionomer resin, wherein the second layer of an ionomer resin forms the inner surface in contact with the contents of the pouch.

6. The pouch according to claim 5 wherein the polymeric barrier film comprises a polyvinylidene chloride methyl acrylate copolymer having a methyl acrylate content of up to about 12% by weight and the film is irradiated.

7. The pouch according to claim 6 wherein the polyvinylidene chloride methyl acrylate copolymer contains from 3% to 8% by weight methyl acrylate and the film is from about 1.5 to about 3.0 mils thick.

8. The pouch according to claim 6 wherein the roughened areas are located at the corners of the pouch and the pouch is suitable for use in retort applications.

9. An easy open airtight tear control pouch made by: forming a hollow tube from a polymeric continuous extrusion laminated, oriented film comprising, in order: an outer layer of polyester, a layer comprising polyvinylidene chloride copolymer, a layer comprising ultra linear low density polyethylene, a layer of ethylene vinyl acetate having a vinyl acetate content of from about 28% to 35% by weight, a first layer of an ionomer resin and a second layer of an ionomer resin, said tube having a first end and a second end, an outer surface and an inner surface;

roughening a circumferential area, or a portion of a circumferential area, of said tube on at least one of said surfaces, either continuously or randomly in either the machine direction or cross machine direction; and cutting said tube in the cross machine direction and sealing one of said ends to form said pouch.

10. The pouch according to claim 9 wherein the polymeric barrier film comprises a polyvinylidene chloride methyl acrylate copolymer having a methyl acrylate content of up to about 12% by weight and the film is irradiated.

11. The pouch according to claim 10 wherein the polyvinylidene chloride methyl acrylate copolymer contains from 3% to 8% by weight methyl acrylate and the film is about 1.5 to 3.0 mils thick.

12. The pouch according to claim 10 wherein the roughened areas are located at the corners of the pouch and the pouch is suitable for retort applications.

13. An easy open airtight tear control pouch made by: forming a first sheet and a second sheet of polymeric continuous extrusion laminated, oriented film, each of said sheets comprising in order: an outer layer of polyester, a layer comprising polyvinylidene chloride copolymer, a layer comprising ultra linear low density polyethylene, a layer of ethylene vinyl acetate having a vinyl acetate content of from about 28% to 35% by weight, a first layer of an ionomer resin, and a second layer of an ionomer resin;

roughening at least one of said surfaces of said first and second sheets either continuously or randomly in either the machine or cross machine direction; and forming said pouch from said first and said second polymeric sheets, having a first outer surface and a second outer surface, said second outer surface being on the side opposite said first outer surface, wherein said outer surface of each said sheet is the outer layer of polyester of said sheet, said pouch having first and second inner surfaces on said first and second sheet structures respectively, in a face to face relationship.

14. The pouch according to claim 13 wherein the polymeric barrier film comprises a polyvinylidene chloride methyl acrylate copolymer having a methyl acrylate content of up to about 12% by weight and the film is irradiated.

15. The pouch according to claim 14 wherein the polyvinylidene chloride copolymer contains from 3% to 8% by weight methyl acrylate and the film is about 1.5 to about 3.0 mils thick.

16. The pouch according to claim 14 wherein the toughened areas are located at the corners of the pouch and the pouch is suitable for retort applications.

* * * * *